United States Patent
Tan et al.

(10) Patent No.: US 7,720,072 B2
(45) Date of Patent: May 18, 2010

(54) METHOD FOR DYNAMIC BANDWIDTH ALLOCATION IN PASSIVE OPTICAL NETWORK

(75) Inventors: Peilong Tan, Shenzhen (CN); Jun Zhao, Shenzhen (CN); Yu Liu, Shenzhen (CN); Jianming Hong, Shenzhen (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 746 days.

(21) Appl. No.: 10/576,520

(22) PCT Filed: Oct. 21, 2004

(86) PCT No.: PCT/CN2004/001195

§ 371 (c)(1),
(2), (4) Date: Jan. 30, 2007

(87) PCT Pub. No.: WO2005/039078

PCT Pub. Date: Apr. 28, 2005

(65) Prior Publication Data

US 2007/0140258 A1    Jun. 21, 2007

(30) Foreign Application Priority Data

Oct. 21, 2003    (CN) .................... 2003 1 0101183

(51) Int. Cl.
*H04L 12/28* (2006.01)
*H04L 12/56* (2006.01)

(52) U.S. Cl. ................ 370/395.21; 370/395.4

(58) Field of Classification Search ............ 370/395.21, 370/395.4
See application file for complete search history.

(56) References Cited

U.S. PATENT DOCUMENTS 6,546,014 B1 *   4/2003   Kramer et al. ......... 370/395.41

(Continued)

FOREIGN PATENT DOCUMENTS

CN    1321011 A    11/2001

(Continued)

OTHER PUBLICATIONS

Osamu Yoshihara, GE-PON, Dynamic Bandwidth Allocation Algorithm for GE-PON, vol. 102 No. 20 IEICE Technical Report.

(Continued)

*Primary Examiner*—Huy D Vu
*Assistant Examiner*—Maria L Sekul
(74) *Attorney, Agent, or Firm*—Conley Rose, P.C.; Grant Rodolph (57) ABSTRACT

A method for dynamic bandwidth allocation in Passive Optical Network (PON), said PON includes a OLT and a plurality of ONUs accessing to the OLT, comprising: classifying traffic which is to be communicated between the OLT and the ONUs into a plurality of service types, and granting a different priority to each type of the services; authorizing service ports of every type of services to transmit service data in descending sequence of said priorities of the services, and recording granting information of the service ports obtained from the authorization; reading out said granting information of every to-be-granted service port of a same ONU; and scheduling granted start time of data transmission of every to-be-granted port of current ONU, generating downlink granting messages including both said granting information and said granted start time of data transmission of every granted port of said current ONU, transmitting said downlink granting messages to said current ONU. This method for bandwidth allocation in the present invention can satisfy requirements of different types of services, increase bandwidth utilization ratio and realize equal bandwidth allocation.

21 Claims, 7 Drawing Sheets

U.S. PATENT DOCUMENTS

| | | | |
|---|---|---|---|
| 6,956,854 B2 * | 10/2005 | Ganesh et al. | 370/392 |
| 6,978,144 B1 * | 12/2005 | Choksi | 455/452.2 |
| 6,987,753 B2 * | 1/2006 | Liu et al. | 370/348 |
| 7,362,975 B2 * | 4/2008 | Choi et al. | 398/58 |
| 7,443,861 B2 * | 10/2008 | Lee et al. | 370/395.42 |
| 2003/0190168 A1 * | 10/2003 | Song et al. | 398/168 |

FOREIGN PATENT DOCUMENTS

| | | |
|---|---|---|
| CN | 1384619 A | 12/2002 |
| CN | 1420652 A | 5/2003 |
| EP | A1-1 215 931 | 6/2002 |
| EP | A-1 315 396 | 5/2003 |
| EP | 1330077 | 7/2003 |
| JP | 2003-3289332 A | 10/2003 |
| JP | 2004-177712 A | 6/2004 |

OTHER PUBLICATIONS

Ken Murakami, IEEE802.3ah, Status toward standardization in IEEE802.3ah and items on the construction of GE-PON system, vol. 103 No.124 IEICE Technical Report.

* cited by examiner

METHOD FOR DYNAMIC BANDWIDTH ALLOCATION IN PASSIVE OPTICAL NETWORK

CROSS-REFERENCE TO RELATED APPLICATIONS

This application is a National Stage of Patent Cooperation Treaty (PCT) Application No. PCT/CN2004/001195, filed Oct. 21, 2004, entitled, DYNAMIC BANDWIDTH DISTRIBUTION METHOD IN PASSIVE OPTICAL NETWORK, which claims priority to Chinese Patent Application No. 200310101183.8, filed Oct. 21, 2003, all of the disclosure of which are hereby incorporated by reference in their entirety.

FIELD OF THE TECHNOLOGY

The present invention relates to optical communication field, especially to a method for dynamic bandwidth allocation in Passive Optical Network (PON).

BACKGROUND OF THE INVENTION

As a new broadband access optical fiber technology covering the "last mile", PON needs no active node and only a simple optical splitter needs to be installed. Thus PON has the advantage of saving optical cable resource, sharing bandwidth resource, saving equipment room investment, high security device, rapidity of setting up network, low cost of network building, and so on. As a primary type of present optical access network, PON has been widely applied.

Figure 1:
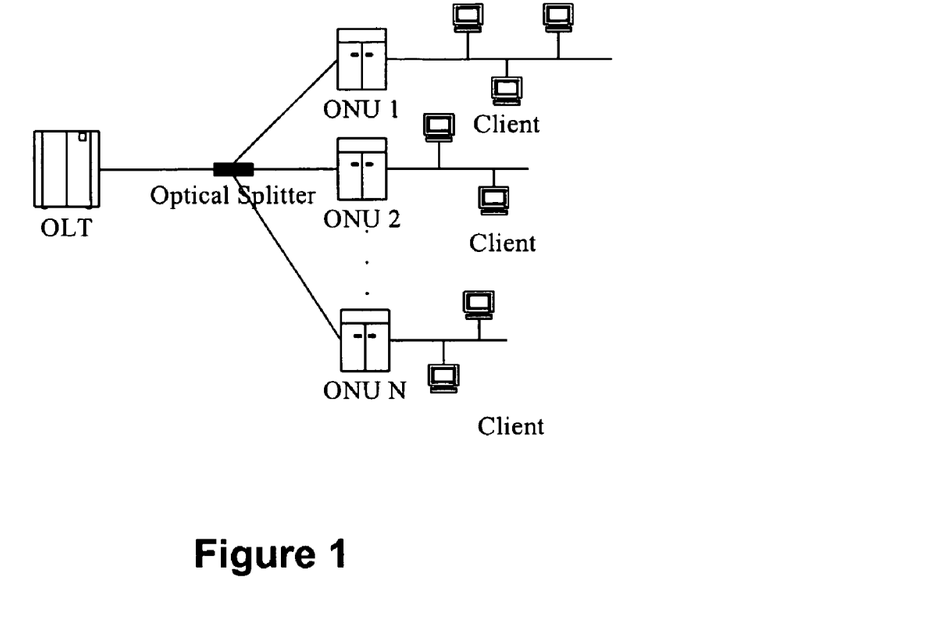
FIG. 1 is a sketch map of a Passive Optical Network.

PON takes the point-to-multipoint master-slave control structure. With reference to FIG. 1, an Optical Line Terminal (OLT) is a master node device, which is connected with a plurality of Optical Network Units (ONUs) through optical splitter, and the processes of the ONU registration, authorization of the data waiting to be transmitted, message interaction of Media Access Control (MAC) sub-layer and so on are performed at the OLT. The ONU is a slave node device, responding to the OLT finding message, reporting the sizes of data waiting to be transmitted, transmitting data of every port according to granting information, and a plurality of client terminals are accessed to the ONU to support multi-service access. With such frame structure as in optical access network, the problem of how to reasonably allocating bandwidth and effectively using network resource to meet service requirement is of great importance to PON MAC scheme.

In optical access network, there are two ways of allocating bandwidth: Static Bandwidth Allocation (SBA) and Dynamic Bandwidth Allocation (DBA). As to SBA, ONUs or its port is allocated with fixed bandwidth and unused time slot cannot be arbitrarily occupied. The disadvantage of SBA is low bandwidth utilization ratio and poor adaptive faculty to self-likelihood service with high burst ratio. DBA algorithm is a mechanism or algorithm for rapidly re-allocating bandwidth based on requirements of the current client service. As to DBA, the PON bandwidth utilization ratio can be increased by dynamically adjusting bandwidth, with reference to requirements of ONUs burst service.

At present, there are a lot of dynamic bandwidth allocation methods, For example, an Interleaved Polling with Adaptive Cycle Time (IPACT) dynamic bandwidth allocation method for PON; a DBA protocol special for APON which is put forward in G.983.4 standard by ITU-T (International Telecommunication Union-Telecommunication) Standardization Sector.

The main idea of IPACT is that polls the next ONU before the data sent by the former ONU arrive at OLT, thereby, to determine whether to authorize and how much to authorize, etc. and determine the start time of the data transmission of the next ONU according to the calculated arrival time of the last bit of the data of the current ONU.

As to the second scheme, a DBA protocol is put forward in ITU-T G.983.4 standard, service from ONU is divided into several types of T-CONT (Transmission Container). According to service priority, there are four types of T-CONT, in descending priority they are T-CONT1, T-CONT2, T-CONT3 and T-CONT4, while T-CONT5 is adaptive to all services in order to reduce number of transmission containers. Every type of T-CONT corresponds to a specific requirement of bandwidth allocation. There are four types of bandwidth allocation requirements: constant bandwidth, assured bandwidth, non-assured bandwidth and best-effort transmission bandwidth. And there are three strategies in the present DBA protocol: NSR (Non-Status-Reporting), SR (Status-Reporting) and mixing type.

In the first technology scheme mentioned above, the polling period adaptively varies with amount of data, resulting in data transmission jitter in the same service, so the requirement of low delay and delay jitter for real-time service is not be satisfied. In the second technology scheme, Round-Robin constant sequence polling is adopted, which is special for connection-oriented APON application with fixed length of PDU (Protocol Data Unit). Additionally, the bandwidth updating mechanism is special for T-CONT and bandwidth is allocated neither according to different ports nor different services.

In the above two schemes, since different allocating strategies for different services are not taken into account, they are applied in single service system in practical application, such as in system only providing browsing service or voice service. This kind of system cannot meet Quality of Service (QoS) requirement of more than one service type, neither allocate bandwidth according to client service ports. Moreover, when allocating bandwidth, granting messages of window allocation are basically generated in sequence of port reporting, without considering delay requirement of different ONU ports, and bandwidth utilization ratio is also low; in addition, there is no dynamic process if ONUs are offline.

SUMMARY OF THE INVENTION

The present invention is to provide a method for dynamic bandwidth allocation in PON, wherein said PON includes an OLT and a plurality of ONUs accessing to the OLT, the method comprises:

a) classifying services which are to be communicated between the OLT and the ONUs into a plurality of service types according to different transmitting requirements, and granting a different priority to each type of the services;

b) authorizing service ports of every type of services to transmit service data in descending sequence of said priorities of the services, and recording the granting information of the service ports obtained from the authorization;

c) reading out said granting information of every to-be-granted service port of a same ONU; and d) scheduling granted start time of data transmission of every to-be-granted service port of current ONU, generating downlink granting messages including both said granting information and said granted start time of data transmission of every granted port of said current ONU, transmitting said downlink granting messages to said current ONU.

It is obvious from the above-mentioned technical scheme that this method bears the following advantages: dynamically performing bandwidth allocation aiming at different services with different priority levels, in order to satisfy requirements of different service types and implement service transparency; when generating granting message, authorizing start time of data transmission to a group of ports accessed to the same ONU, in this way all the granted windows of different service ports accessed to the same ONU are consecutive with no protective band inserted, the protective bandwidth for data transmission is reduced and bandwidth utilization ratio is increased.

In addition, ONU information aging mechanism is adopted in the present invention. By supervising ONU status real-timely, off-line ONU can be dynamically processed thus occupied resource is released.

Compared with the existing technologies, technology scheme of the present invention is of visible and beneficial effects. In this scheme, dynamic bandwidth allocation is transparent to services, to satisfy requirements of more than one service, such as transmission of TDM/EF, AF, DF and MPCP message as well as ensured transmission of CPU/OAM. Beneficial effects of this scheme further comprises: increased bandwidth utilization ratio, fair bandwidth allocation, better robustness, better real-time performance, using bandwidth resource more effectively and avoiding resource waste.

DETAILED DESCRIPTION OF THE INVENTION

The embodiments of the present invention will be described in detail with reference to the attached drawings.

In the present invention, a method of dynamic bandwidth allocation in Passive Optical Network is put forward. This method comprises service registration, bandwidth allocation, granting message generation and ONU information aging, etc. Firstly, different services are classified in sequence of priority and given different data structure so as to perform different allocation strategies. When allocating bandwidth, different service ports accessed to the same ONU are distinguished in terms of different service types and processed separately by allocating corresponding window size; when generating granting messages, different service ports accessed to the same ONU are processed collectively, start time of data transmission is assigned, in this way granted windows of different service ports accessed to the same ONU are consecutive with no protective band inserted, thus bandwidth utilization ratio is increased. In addition, the ONUs status is real-timely supervised in the present method and the off-line ONU is dynamically released. Wherein, the mentioned service port is a port carrying a certain service. The service port is a logical conception, not really corresponding to an ONU physical port. For instance, if a physical port carries multi services at the same time, this port can be divided into more than one logical service port.

A preferred embodiment of the present invention is introduced in detail as follow.

To separately process different service ports, different services in a PON need to be classified into a plurality of service types. Also, data structures of different services as well as different ports need to be set up for the system to separately process. In a preferred embodiment of the present invention, in descending sequence of priority, traffic is classified into following services:

Fast Forwarding service: such as TDM (Time Division Multiplex), EF (Expedited Forwarding), etc. These services can be named by a joint name EF service. This kind of service needs to be real-timely forwarded with low delay and delay jitter without bandwidth limit, thus has the highest priority.

MPCP (Multi-Point Control Protocol) message service: MPCP message is used for normal MPCP communication, comprised of automatic detecting MPCP message service and non-automatic detecting MPCP message service. Relevant parameters of MPCP message are all constant. In the present invention, MPCP message of an ONU is used to judge whether this ONU is online.

MF (Must Forwarding) service: such as CPU (Central Process Unit) message and OAM message, and messages must be correctly transmitted in this kind of service which is used for OAM&P (Operation Administration, Maintenance and Provision) and communication between OLT and ONUs, thus has pretty high priority too.

Assured Forwarding service: such as AF (Assured Forwarding), specified minimum bandwidth must be assured in this service but with low real-time requirement.

Best-Effort Forwarding service: such as DF (Default Forwarding), there is no requirement for minimum bandwidth thus with the lowest priority.

In the present invention, collective control way of report information is adopted with OLT managing status of every ONU. In a preferred embodiment of the present invention, IEEE 802.3ah standard is adopted in automatic detection of ONU and info interaction of registration course.

When data transmit authorization is being performed, in order to polling according to different services and in sequence of priority, in a preferred embodiment of the present invention, Service Active ONU Bitmap register is set up to store ONU activation info of different services, such as IMAB (Ingress MPCP Active Bitmap) of the MPCP message service, IMFAB (Ingress Must Forwarding Active Bitmap) of the MF service, IEFAB (Ingress Expedited Forwarding Active Bitmap) of the EF service, IAFAB (Ingress Assured Forwarding Active Bitmap) of the AF service and IDFAB (Ingress Default Forwarding Active Bitmap) of the DF service. Among others, some services take port as unit, such as the services of EF, AF and DF, then Service Active Port Bitmap table must be set in these services to store active information of ports, such as IEFABT (Ingress Expedited Forwarding Active Bitmap Table) of the EF service, IAFABT (Ingress Assured Forwarding Active Bitmap Table) of the AF service and IDFABT (Ingress Default Forwarding Active Bitmap Table) of the DF service.

Figure 2:
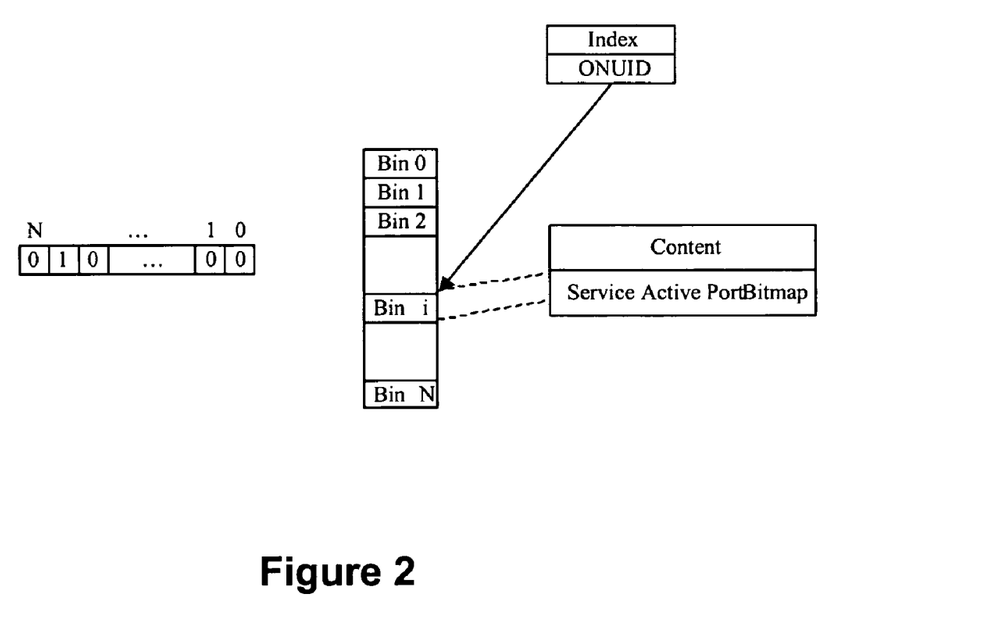
FIG. 2 illustrates the structure of Service Active ONU Bitmap register and corresponding Service Active Port Bitmap table, according to a preferred embodiment case of the present invention.

With reference to FIG. 2, the left box is the Service Active ONU Bitmap register, which is comprised of N bits respectively corresponding to N ONUs and is used to indicate whether this service is active, for example, with 1 as active and 0 as inactive. The right box is the Service Active Port Bitmap table, that is comprised of N table items corresponding to the ONUs, with content of every table item storing information concerning every port accessed to a corresponding ONU, and this information indicates whether the port is active or not, for example, with 1 as active and 0 as inactive. In the system, these tables are put into a register and can be indexed for relevant ONU table items according to corresponding ONUID (Optical Network Unit Identifier), convenient for reading active information of service port.

It is necessary to specify that in service registration course, the LLID (Logical Link Identifier) allocated to ONU is of the format as {ONUID, active Bitmap}, which is convenient for indexing of various service active info and bandwidth allocation info by using ONUID and offset of every port, also convenient for developing multicast service.

MPCP port of ONU is activated during registering, and registration info is stored in IMAB; MF port is activated after the ONU is registered and registration info is stored in IMFAB. Hereby each ONU is defaulted to provide with CPU and OAM service.

After being successfully registered, for those services with port as unit, ONUs request bandwidth from the OLT, and bandwidth info is delivered by network manager through interacting with the CPU. Bandwidth information comprises active information of EF service port, active information and bandwidth of AF and DF service port. Thereby, since the bandwidth in every virtual frame period of the EF service is constant, thus port bandwidth is not necessary to be included in the bandwidth information. Active information of the EF, the AF and the DF services ports are respectively stored in IEFAB, IAFAB, IDFAB and corresponding table item of IEFABT, IAFABT, IDFABT. Corresponding bits of IEFAB, IAFAB and IDFAB respectively indicate whether there is active information in EF, DF or AF services of the ONU. Corresponding table items of IEFABT, IAFABT and IDFABT respectively indicate which ports of the ONU are of active EF, DF and AF services.

As to those ports requesting constant bandwidth, such as the EF, since bandwidth in every virtual frame period is constant, a register with constant bandwidth info can be set to store the constant bandwidth; or a default bandwidth can be predefined, after acquiring port type through information interaction, then data can be transmitted by this default bandwidth.

As to those ports requesting dynamic bandwidth control, such as the DF and the AF services, BIT (Bandwidth Information Table) is set to store bandwidth information of provision. For convenience, provision bandwidth is converted to and stored in transmit quantum format. Hereby the transmit quantum means the amount of data allowed to transmit in every constant polling period. This transmit quantum is calculated by multiplying provision bandwidth by polling period, with Byte or Word as unit. In the present invention virtual frame period of EF service is adopted as the polling period of bandwidth allocation operation. Similarly, by indexing ONUID and Offset of every port, corresponding table item content is read and provision bandwidth information is acquired from BIT table by the system.

By interacting with network manager, OLT of the system can dynamically operate and modify relevant bits of Service Active ONU Bitmap register, activate relevant table items content in the Service Active Port Bitmap table and the BIT. In this way, dynamic inserting/deleting and re-configuration of bandwidth information of ONU service port are realized.

In every polling period, ONU reports sizes of data waiting to be transmitted to OLT through REPORT message of IEEE 802.3ah standard. According to IEEE 802.3ah standard, every REPORT message comprises 8 arrays of data sizes reported item. And the corresponding relationship between every array and ONU port is pre-defined so that OLT can specify which port the reported sizes are from. Meanwhile valid indicator of every array is set, for example, every bit of 8 bits respectively indicates whether every array is valid or active, with bit 0 indicating array 0, bit 1 indicating array 1, . . . , and so on. For example, bit 0 indicates that corresponding array is inactive and 1 indicates active or valid. When more than 8 ports are accessed to ONU, multi REPORT messages attributes are adopted and flags are carried in the messages to indicate the continuity of multi REPORT messages in one period, thus OLT can determine from the multi REPORT messages which port the reported item is from.

Figure 3:
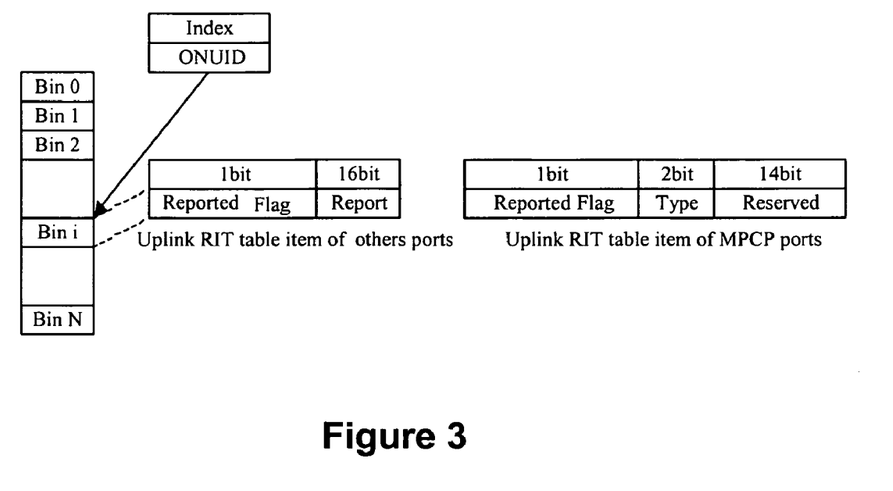
FIG. 3 is a structure of vMAC Report Information table according to a preferred embodiment of the present invention.

In order to separately process the report information from each port, OLT stores the reported sizes of data waiting to be transmitted in RIT (vMAC Report Information Table) assorted by vMAC (Virtual MAC). With reference to FIG. 3, structure of the RIT is shown on the left: each table item is corresponding to each piece of report information of each ONU port, and the items are indexed by ONUID. As to data of general service, such as OAM, CPU and general forwarding service, table item is comprised of reported flag ("Reported Flag") and the reported sizes of data waiting to be transmitted ("Report"). Thereby "Reported Flag" indicates whether vMAC is to report the stored data in the current virtual frame period. The numerical unit of "Report" is the same as that of transmit quantum, namely Byte or Word. For MPCP message service, with reference to FIG. 3 on the right, Reported Flag, uplink MPCP message type ("Type") and reserved region ("Reserved") table items are comprised in the RIT. Thereby, "Type" demonstrates the type of this uplink MPCP message, such as "REGISTER_REQ", "REGISTER_ACK", "Normal REPORT" and so on, making clearly to OLT which registration period ONU is in and making definite which type of downlink MPCP message should be generated. For EF service, as soon as virtual frame period is fixed, the port can only transmit constant sizes data in a virtual frame period, thus there is no need to report sizes of data waiting to be transmitted.

Bandwidth allocation, namely authorization of ONU by OLT to transmit service data, is actually a polling grant course according to service priority. This course is performed by OLT according to port active information, bandwidth allocation information and report information of ONU. To guarantee QoS of EF service, virtual frame period is set as polling grant period. Bandwidth allocations for other services are also performed in this virtual frame period in sequence of priority. At the beginning of virtual frame period, EF bandwidth allocation is performed. The services of MPCP, MF, AF and DF are sequentially performed in the residual time.

The procedure of uplink service data transmission in the embodiment of the present invention will be described in detail with reference to FIG. 4.

In this embodiment, in descending sequence of priority services are EF service, automatic detecting MPCP message service, non-automatic detecting MPCP message service, MF service, AF service and DF service, and these services are sequentially polled and granted.

For the convenience of sending granting message to each type of uplink service by OLT, vMAC GIT (Granting information Table) is set in this implemented case for storing granting information of transmit authorization. In uplink receiving procedure, data of the GIT are read and granting information is created by OLT. And then, the granting information is transmitted by OLT to corresponding ONU, and dynamic bandwidth allocation is finished.

Figure 4:
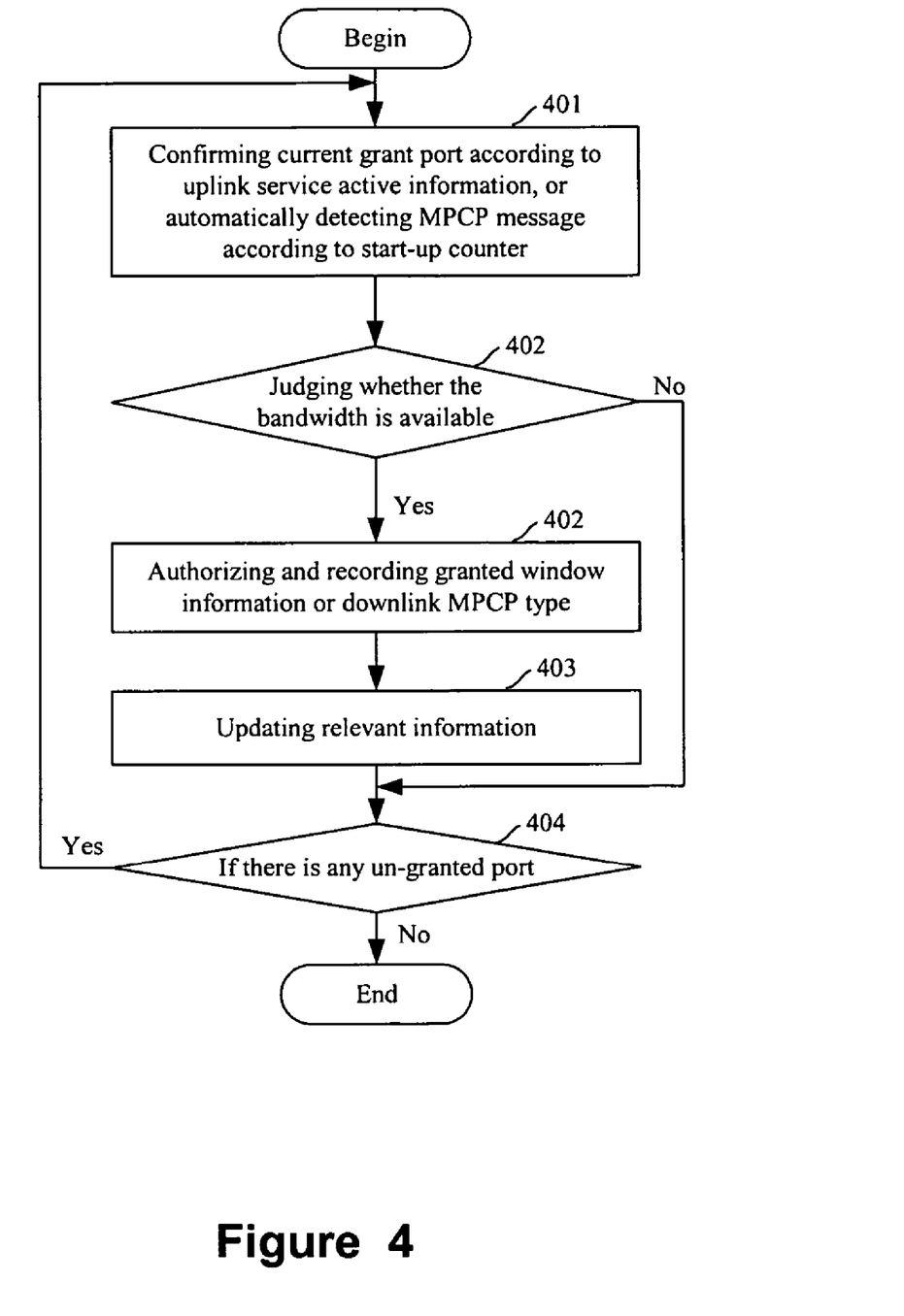
FIG. 4 illustrates the authorization flow of different services according to a preferred embodiment of the present invention.

FIG. 4 demonstrates authorization flow of each type of service in the present embodiment.

Step 401: the OLT confirms current to-be-granted service port according to uplink service active information, or touches off the start-up counter of the automatic detecting MPCP message service.

For services like EF, MF, AF, DF and non-automatic detecting MPCP message, current to-be-granted service port can be confirmed through polling the Service Active ONU Bitmap registers and Ingress Active Bitmap tables. The specifics are: polling the Service Active ONU Bitmap registers of each service in descending sequence of priority. For MF and non-automatic detecting MPCP message service, the Service Active ONU Bitmap register of this service is polled to find out the ONU activated by the type of service through active information of table item, and this ONU port is taken as the one to be granted. For those service with port as unit, like EF, AF, and DF, the Service Active ONU Bitmap register of this service is polled to find out the ONU activated by this service, then the Service Active Port Bitmap table of this service is looked up with the ONUID of the found ONU, and further this service is confirmed to be activated by which port of this ONU.

For automatic detecting MPCP message service, in order to make the new on-line ONU be dynamically registered, an automatic detecting MPCP message service start-up counter is set; automatic detecting MPCP is started as soon as the counter achieves the configured threshold. If automatic detecting MPCP service is detected, enters step 402; otherwise returns to step 401. In this way, periodic automatic detecting MPCP procedure is implemented and not much bandwidth is occupied.

Step 402: the OLT searches for report information of current to-be granted service port in the RIT table, and judges whether the current bandwidth is available for granting, if yes, authorizes bandwidth and records granting information in the GIT; otherwise jumps to step 404.

Thereby, for EF, MF and MPCP message services, the availability of bandwidth resource is judged according to port provision bandwidth, namely according to the allowed amount of data (for EF and MF service) or constant amount of data of MPCP (for MPCP service) in one virtual frame period, and the residual bandwidth in the current virtual frame period. When the former is greater than the latter, bandwidth resource is available and granting is allowed.

For AF service, only when the following conditions are satisfied, the bandwidth resource can be judged as available: there are primed data reported at the port and the reported primed amount of data is less than both the residual allowed amount of data and sum of bandwidth provision transmit amount of data and deficit quantum. Here the provision transmit amount of data can be substituted by transmit quantum inquired in BIT table through ONUID and Offset index.

For DF service, only when the following conditions are satisfied, the bandwidth resource can be judged as available: there are primed data reported at the port and the residual reported primed data is no less than the maximum of reported amount of data and bandwidth provision transmit amount of data. Here the provision transmit amount of data can be substituted by transmit quantum inquired in BIT table through ONUID and Offset index.

If bandwidth is available, OLT authorizes the current port to transmit, and records the granting information in the GIT. For the EF service, the OLT confirms the Start Time and the sizes of data transmission according to the Arriving Stamp of reserved data and protective band and then records said Start Time and said sizes of data transmission in corresponding table item of the port in the GIT of this service. The identifier of said Arriving Stamp of reserved data is the identifier of the pre-defined data arrival time in the next uplink virtual frame period. The reference standard of the identifier is the oscillatory clock at the OLT.

For the MPCP message service, the OLT confirms downlink MPCP message type according to uplink message type of current MPCP port in the RIT. Hereby, for the automatic detecting MPCP message service, downlink message type is constant. Then the OLT records the confirmed MPCP type and Granted Flag in the GIT table item corresponding MPCP port. If the service is the automatic detecting MPCP message service, the OLT may only record the Granted Flag in the GIT.

For the MF and the DF service, the OLT authorizes current port a size of the granted window according to the reported data sizes info in the corresponding table items of the RIT, and records the granted window size in corresponding GIT table item.

For the AF service, the OLT authorizes the size of the granted window according to the reported data sizes info in the corresponding table items of the RIT and the existing grant deficit. Meanwhile, the OLT calculates a new grant deficit. Then the OLT records the granted window size and the new grant deficit in corresponding GIT table item.

Step 403: the OLT updates residual bandwidth in current virtual frame period and information relevant to the current to-be-granted service port.

Specifically comprising: updating residual bandwidth in current virtual frame period; updating arrival time stamp of current reserved data and residual bandwidth in virtual frame period in EF service; as far as automatic detecting MPCP is concerned, resetting start-up counter and directly returning to step 401; clearing out the Reported Flag in corresponding RIT of MPCP, MF, AF and DF. Thereby clearing out the Reported Flag is to avoid repeating authorization in the next virtual frame period.

In a preferred embodiment of the present invention, "funnel algorithm" is adopted as granting dispatching method in AF service. One skilled in the art should comprehend that weighing polling algorithm also can be adopted as granting dispatching method in AF service without affecting essence and scope of the present invention.

Step 404: the OLT judges whether there are un-granted ports, if yes, returns to step 401; otherwise ends port authorization of this priority level and enters into another port authorization course of the next priority level.

Specifically, for MF and non-automatic detecting MPCP, the mentioned determining course is: the OLT judges whether there are unread table items in the currently polled Service Active ONU Bitmap register, if yes, there are un-granted ports; otherwise, authorization to this kind of service is finished. While for the services with port as unit, like EF, AF and DF, the OLT firstly judges whether there are unread table item in the currently polled Service Active Port Bitmap table, if yes, continues to inquire the next table item; otherwise continues to judge whether there are unread table item in the currently polled Service Active ONU Bitmap register, if yes, there are un-granted ports; otherwise, authorization to this kind of service is finished.

Thereinto, for automatic detecting MPCP, since there is at most one authorization in a virtual frame period, the OLT ignores step 404 and directly takes the authorization course to the service with the next priority level.

Figure 5:
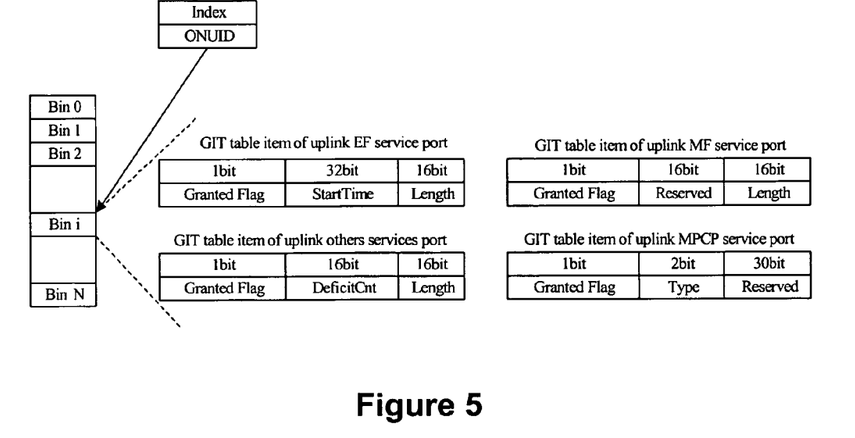
FIG. 5 is Granting information table structure of vMAC according to a preferred embodiment of the present invention.

FIG. 5 demonstrates the structure of the GIT, with each table item corresponding to granting information of each ONU port, and the items are indexed by ONUID.

For uplink EF service, the table item is comprised of the Granted Flag, the start time of data transmission ("Start Time") and the size of data transmission ("Length"). Here, the Granted Flag indicates whether this service port is granted, the Start Time clarifies to this granted port when to start transmitting data, the Length equals granted window size and indicates how many data are granted to transmit.

For uplink MF service, the table item is comprised of the Granted Flag, Reserved and the Length. Here Reserved means the undefined part reserved for future use.

For MPCP service, the table item is comprised of the Granted Flag, the Type and the Reserved. Here Type is comprised of "Discovery GATE", "Normal GATE" and "REGISTER&GATE". Here, downlink MPCP with GATE type is specially used to carry the granting message.

For other services, like DF and AF, the table item is comprised of "Granted Flag", "Deficit Count" and "Length". Here, Deficit Count is used for recording authorization deficit of this port. Grant deficit reflects the extent when accumulative grant bandwidth exceeds reported bandwidth in the former uplink service period. And the system makes equal QoS guarantee of AF or DF service through authorization deficit; for DF service, since authorization deficit is ignored, value of Deficit Count can be set zero.

During the authorization stage as said above, Start Time is only authorized to the EF service. For other services, such as automatic detecting MPCP message service, its registration window size is constant to PON system with constant ONU number and constant maximum spread space; for non-automatic detecting MPCP, granted Length is constant since the MPCP message length is constant, and granted Length is not written into the GIT any more; for AF and DF services, granted Length must be written into the GIT since granted Length of service port is non-constant.

Figure 6:
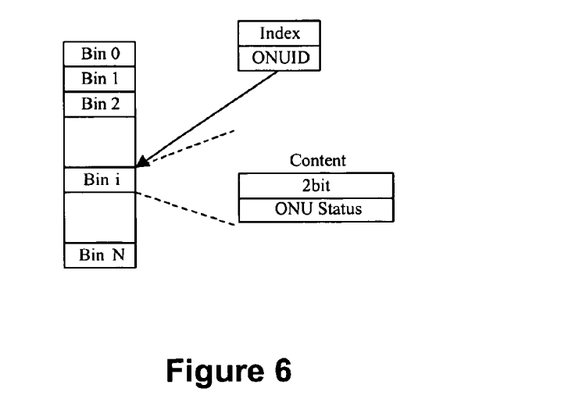
FIG. 6 is ONU Status Information table structure of ONU according to a preferred embodiment of the present invention.

For convenient ONU management, ONU Status Information Table (SIT) is set in the present invention for flagging ONU status information. FIG. 6 illustrates structure of the Status Information Table. Each ONU corresponds to one table item containing ONU status and the items are indexed by ONUID. In a preferred embodiment of the present invention, two bits are used to flag ONU status of Invalid Entry, Registered ONU and Registering ONU. Here, Invalid Entry indicates that no ONU is assigned to this ONUID; Registered ONU means this ONU has finished registering and service data forwarding can be performed; Registered ONU means this ONU is registering, in this status, current interacted messages can be confirmed according to RIT table item of MPCP port and GIT table item of the present ONU. ONU Status Information Table item is generated in the interactive procedure of MPCP messages. Current ONU status depends on both the former status and interacted MPCP message between OLT and the ONU in the former status. For instance: when in Invalid Entry status, if Discovery GATE MPCP message is received by the ONU and REGISTER_REQ MPCP message is sent out to OLT, ONU gears into Registering ONU status; when in Registering status, if REGISTER_ACK message is received by the OLT, the ONU gears into Registered status.

After finishing authorization operation of service transmission, OLT will generate granting messages in the virtual frame period and send the granting messages to corresponding ONU at a certain time. The principle of granting message generation is: in order to reduce the granting messages of each ONU service port and for the sake of less protective bands and synchronization time sects, transmit windows of all port services are successive and adjacent except EF service. So, except EF service, start time of granted data transmit of all port services are confirmed and written into granting message during the granting message generation period. This is because low delay and low delay jitter is needed in EF service, and timing transmission is always adopted in terms of these ports. Thus, for EF service, granted start time of data transmission and granted sizes of data transmission should be already confirmed during the granting message creating period. While for other service ports, only granted sizes of data transmission are confirmed during the granting message creating period and granted start time of data transmission are confirmed during the granting message generation period. The purpose is to make ports' granted windows of the same ONU be successive and adjacent in time field, consequently reduce protective bands number and increase bandwidth utilization ratio.

Figure 7:
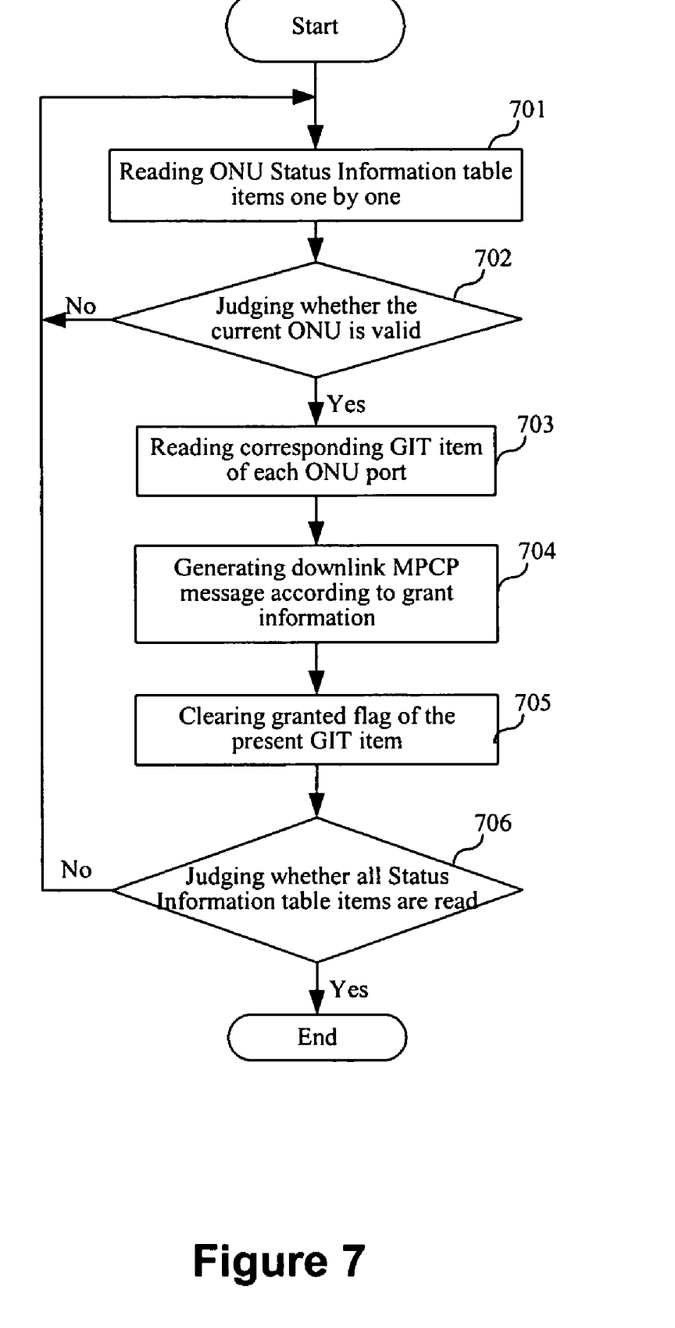
FIG. 7 is a flow diagram of method for generating granting information according to a preferred embodiment of the present invention.

FIG. 7 shows a flow of granting message generation method based on a preferred embodiment of the present invention.

A granting message is generated with ONU as unit in the system so that granting message is carried in downlink MPCP message with GATE type. Furthermore, service ports belonging to the same ONU can be granted universally.

As is shown in FIG. 7, in step 701, reading out ONU status information table items one by one according to ONUID index.

Step 702: determining whether current ONU is invalid, namely determining whether the corresponding SIT table item of the current ONU's ONUID is 00, if yes, no granting and continuing to read next table item of the SIT, entering step 701; otherwise, namely the corresponding SIT table item of the current ONU's ONUID is 01 or 10, continuing with step 703.

Step 703: reading the corresponding GIT table items of each to-be-granted service port of the current ONU and generating granting information, scheduling granted start time of data transmission for each to-be-granted service port.

This procedure specifically comprising: inquiring corresponding table items of service ports belonging to the same ONU in the GIT through ONUID index, acquiring Grant Status of service ports according to the Grant Flag of the corresponding table item, determining whether current service port is granted, if the service port is granted, reading out relevant information such as the size of data transmission from the corresponding table item and scheduling granted start time of data transmission for the service port.

Thereby for EF service, by inquiring corresponding items of the GIT, acquiring size of data transmission and start time of data transmission, taking the start time as the granted start time of data transmission, writing them directly into downlink MPCP message with GATE type.

For uplink MPCP service, the MPCP message type is acquired by requiring the GIT; in addition, since granted size of data transmission is constant, only the granted start time of data transmission of corresponding service port should be scheduled according to the granted data transmission time stamp which is inherited from data transmission granting period.

For other services, like MF, AF and DF services, the granted size of data transmission is acquired by inquiring the GIT, and scheduling the granted start time of data transmission of corresponding service port according to the granted data transmission time stamp which is inherited from transmission granting period.

Step 704: granting messages being generated and released according to the granting information and the granted start time of data transmission.

Here, the granting information and the granted start time of data transmission of service ports, which belongs to the current ONU, are carried by MPCP message with GATE type. Firstly, downlink MPCP message type to the current ONU is confirmed according to the granted MPCP messages types, which comprises: determining whether there is a granted MPCP message type of the GATE type, if there is a granted MPCP message type of the GATE type, then granted MPCP message is taken as downlink MPCP message, the granting information and the granted start time of data transmission of each granted port confirmed in step 703 are written into the downlink MPCP message with GATE type and then sent out.

Generally, the granting information and the granted start time of data transmission of four ports can be carried in one downlink MPCP message with GATE type. Therefore, if there are more than 4 ports requesting for grant, two or more downlink MPCP messages with GATE type are generated to carry the granting information and the granted start time of data transmission of all ports.

Step 705: setting Granting Flag of GIT table item of current granted port as negative, in order to avoid repeatedly generating granting message.

Step 706: determining whether all items of the SIT are read, if yes, it can be concluded that all ONU granting messages are created and the procedure of generating granting message is to be ended; otherwise returning to step 701 and continuing to read the SIT.

At last, the present invention provides a method for processing offline ONU or fault ONU, namely a method of ONU information aging procedure. ONU Active Timeout Count table is set and each non-response time is counted. If the value exceeds the specified offline threshold, this ONU will be judged as invalid and resource of invalid ONU will be released.

Figure 8:
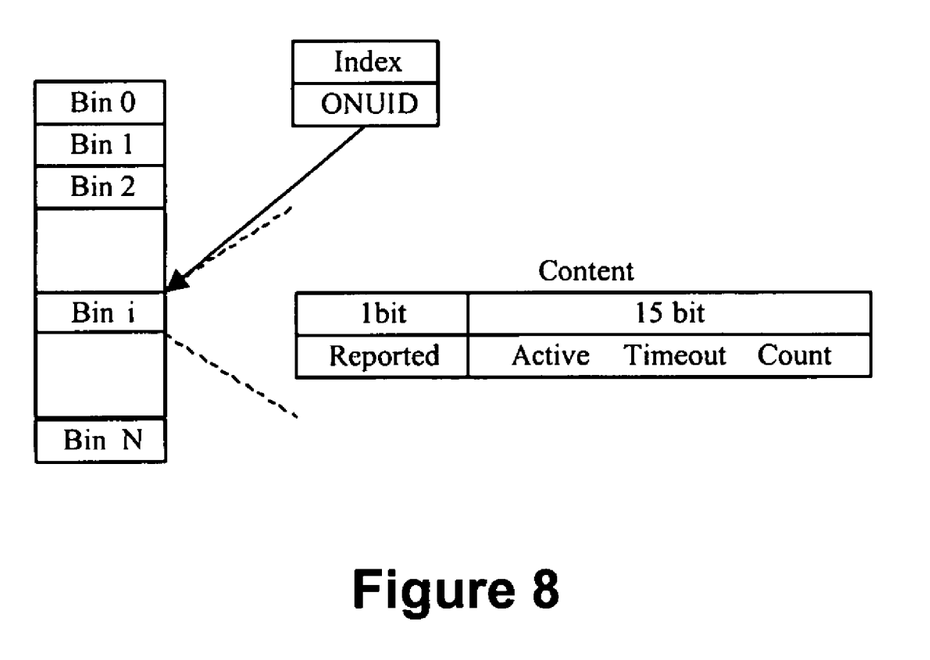
FIG. 8 is a structure of ONU Active Timeout Count table according to a preferred embodiment of the present invention.

FIG. 8 shows structure of the ONU Active Timeout Count table. Each ONU corresponds to one table item and the items are indexed by ONUID. Table item is comprised of Reported flag and ATC (Active Timeout Count).

Figure 9:
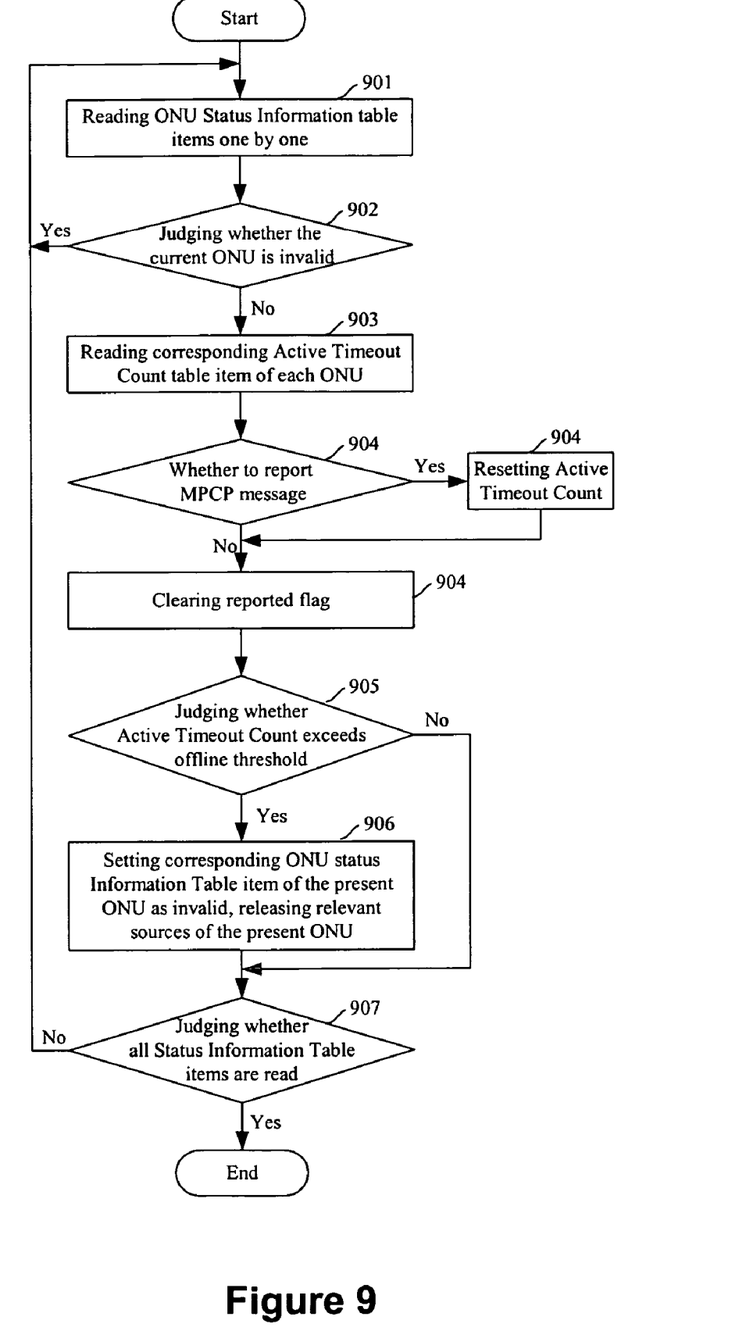
FIG. 9 is a flow diagram of ONU information aging method according to a preferred embodiment of the present invention.

FIG. 9 illustrates flow of ONU information aging method according to an implemented case of the present case.

With reference to FIG. 9, in step 901, reading out the items of the SIT one by one according to ONUID index.

Step 902: determining whether the ONU status information in current item is invalid, if yes, returning to step 901 without processing this invalid ONU and continuing to read next item of the SIT; otherwise entering step 903.

Step 903: reading out the item of the Active Timeout Count table corresponding to the current ONU and entering step 904.

Step 904: determining whether any MPCP message is reported by this ONU in the present virtual frame period according to reported flag of the present item, namely determining whether there exists a reported flag in the table item, if yes, resetting the Active Timeout Count of the present item; otherwise continuing counting. Besides, whatever the determining result is, Reported flag must be cleared out.

Step 905: determining whether the value of the Active Timeout Count exceeds the settled off-line threshold, if yes, it can be concluded that this ONU is offline and entering step 906; otherwise, it can be concluded that this ONU is online and entering step 907.

Step 906: setting the SIT item of the present ONU as invalid, releasing relevant resources of this ONU and entering step 907. In this way, for offline ONU, corresponding item of the SIT is set invalid to indicate nonexistence of this ONU.

Thereby, the released relevant ONU resources comprising: corresponding bits of Service Active Bitmap Registers, such as IMPAB, IMFAB, IEFAB, IAFAB and IDFAB; corresponding items of Service Active Bitmap Table, such as IEFAT, IAFAT and IDFAT, corresponding items of Bandwidth Information Table, as well as ONUID originally assigned to this ONU.

Step 907: determining whether all items of the SIT are read out, if yes, it can be concluded that all the ONUs have been inquired, then ending ONU information aging procedure in the present virtual frame period; otherwise, returning to step 901 and continuing to read the SIT.

The mentioned aging procedure can be repeatedly performed. In a preferred embodiment of the present invention, the ONU information aging procedure of the SIT can be initiated by a certain event. Once the aging procedure is initiated, all table items are traversed to update all the ONUs information. The procedure is ended when all items are traversed, waiting for the next event to initiate this procedure.

The present invention is applicable in master-slave system and ONUs access must be controlled by OLT in this system. All the uplink service data forwarding and accessing of all ONUs, such as MPCP or other MAC messages are controlled by OLT; for downlink situation, broadcast mode is adopted, data being filtered and received by ONU. Downlink transmission dispatching can be based on priority, namely downlink dispatching forwarding be performed in sequence of EF, MPCP, CPU/OAM, AF, DF.

The present invention is illustrated with graphs and description with reference to some excellent implemented cases of the present invention. Despite of that, common technicians in this field should understand that various kinds of changes could be performed in form and detail to the present invention. Those changes are confined to the spirit and scope of the attached claims.

The invention claimed is:

1. A method for dynamic bandwidth allocation in a Passive Optical Network (PON), said PON includes an Optical Line Terminal (OLT) and a plurality of Optical Network Units (ONUs) accessing the OLT, comprising:

a) classifying, by the OLT, services which are to be communicated between the OLT and an ONU into a plurality of service types according to different transmitting requirements, and granting a different priority to each type of the services, said services being classified by priority in descending sequence as Expedited Forwarding (EF) service, automatic detecting Multi-Point Control Protocol (MPCP) message service, non-automatic detecting MPCP message service, Must Forwarding (MF) service, Assured Forwarding service and Best-Effort Forwarding service;

b) authorizing, by the OLT, a service port of each type of services to transmit service data in descending sequence of said priorities of the services, and recording granting information of the service ports obtained from the authorization, the granting information of an EF service port comprising a start time of data transmission and the granting information of service ports carrying services among the automatic detecting MPCP message service, the non-automatic detecting MPCP message service, the MF service, the Assured Forwarding service and the Best-Effort Forwarding service not comprising the start time of data transmission;

c) reading out, by the OLT, said granting information of every to-be-granted service port of the current ONU; and d) scheduling, by the OLT, start time of granted data transmission of every to-be-granted service port of current ONU, generating a downlink granting message including both said granting information and said start time of granted data transmission of every granted port of said current ONU, allocating adjacent granted windows for service ports different from the EF service port of the current ONU when generating the downlink granting message, and transmitting said downlink granting messages to said current ONU.

2. The method according to claim 1, further comprising:

generating, by the OLT, Active Timeout Counter to count non-response periods of each ONU;

and further comprising a flow of aging ONU information:

A. inquiring, by the OLT, status of the ONUs one by one, determining whether the status of current ONU is invalid, if yes, returning to step A; otherwise, proceeding to step B;

B. determining, by the OLT, whether MPCP messages have been reported by said current ONU in the present bandwidth allocation polling period, if yes, resetting corresponding Active Timeout Counter of said current ONU, and proceeding to step C; otherwise, proceeding to step C directly;

C. determining, by the OLT, whether the value of said Active Timeout Counter of said current ONU exceeds the settled off-line threshold, if yes, setting the status of the current ONU as invalid, releasing corresponding resources of this ONU, proceeding to step D; otherwise, proceeding to step D directly; and D. determining, by the OLT, whether all the ONUs are inquired, if yes, ending the ONU information aging flow of the present bandwidth allocation polling period; otherwise, returning to step A, continuing with the inquiry of a next ONU.

3. The method according to claim 2, further comprising:

generating, by the OLT, an ONU Status Information table indexed by ONU Identifier (ONUID), which is to store every ONU's status information that is generated according to MPCP messages communication between the ONUs and the OLT;

generating, by the OLT, an ONU Active Timeout Count table indexed by ONUID, which includes said Active Timeout Counter and reported flags to indicate whether MPCP messages have been reported by corresponding ONUs;

said step of determining in step A comprises: according to ONUID index, reading out, by the OLT, ONU status information from the ONU Status Information table one by one, determining whether current ONU is invalid according to said ONU status information;

said step of determining in step B comprises: reading out, by the OLT, table item of said current ONU from Active Timeout Count table, determining whether there exists a reported flag in corresponding table item of said current ONU, if yes, it can be concluded that MPCP messages have been reported in the present bandwidth allocation polling period; otherwise, it can be concluded that MPCP messages have not been reported;

between step C and step D, further comprising: clearing, by the OLT, the reported flag of said current ONU in the ONU Active Timeout Count table;

said step of determining in step D comprising: determining, by the OLT, whether all table items of the ONU Status Information table are read out, if yes, it can be concluded that all the ONUs have been inquired; otherwise, it can be concluded that some of the ONUs have not been inquired.

4. The method according to claim 1, further comprising:

generating, by the OLT, a vMAC Granting information table indexed by ONUID, which includes granting information of each of the service ports of the ONUs and granted flags to indicate whether corresponding service ports are authorized;

the step of recording granting information in step b) comprises: recording, by the OLT, said granting information in the vMAC Granting information table, setting granted flag of said granted service ports as authorized;

the step of reading out granting information in step c) comprises: searching for, by the OLT, table items corresponding to the service ports of the same ONU in the vMAC Granting information table according to ONUID index, searching for granted service ports according to granted flag, reading out granting information of the granted service ports; and after step d) further comprising: setting, by the OLT, the granted flag as negative of the service ports which have read out granting information.

5. The method according to claim 1, further comprising:

generating, by the OLT, the ONU Status Information table indexed by ONUID, which is to store status information of every ONU that is generated according to MPCP messages communication between the ONUs and the OLT;

before step c) further comprising: reading out, by the OLT, status information of the ONUs one by one from the ONU Status Information table according to ONUID index, determining whether current ONU status is invalid according to the status information of said current ONU, if yes, returning to read a next ONU status information in the ONU Status Information table, otherwise, proceeding to step c).

6. The method according to claim 1, wherein as to services except the automatic detecting MPCP message service, said step of authorization in step b) comprises:

b11) confirming, by the OLT, current to-be-granted service port according to uplink service activating status;

b12) according to the residual bandwidth resource in the current bandwidth allocation polling period, determining, by the OLT, whether current bandwidth resource is available to the constant amount of data of said current to-be granted service port for non-automatic detecting MPCP message service, or to the report information from said current to-be-granted service port for the other types of the services, if yes, proceeding to step b13); otherwise, proceeding to step b15);

b13) authorizing, by the OLT, said current to-be-granted service port to transmit service data, and recording the current granting information;

b14) updating, by the OLT, residual bandwidth in the current bandwidth allocation polling period and relevant information of said current to-be-granted service port; and b15) determining, by the OLT, whether there are un-granted service ports of current priority service, if yes, returning to step b11); otherwise, authorizing the ports of the next priority service.

7. The method according to claim 6, further comprising:
generating, by the OLT, a Service Active ONU Bitmap register for every type of service to store active information indicating whether the type of service is activated in the ONUs;
generating, by the OLT, a Service Active Port Bitmap table for services with port as unit, which is indexed by ONUID, to store active information indicating whether this type of service is activated in the accessed service ports of the ONUs;
generating, by the OLT, a vMAC Report Information table indexed by ONUID, to store report information from the accessed ports of the ONUs;
step b11) comprises: polling, by the OLT, the Service Active ONU Bitmap register and the Service Active Port Bitmap table of every service type in descending sequence of priorities, finding out a service port with positive active information and confirming the service port as said current to-be-granted service port;
before step b12) further comprising: finding out, by the OLT, report information of current to-be-granted service port from the vMAC Report Information table; and
in step b15), determining, by the OLT, whether there are unread table items in current Service Active ONU Bitmap register and current Service Active Port Bitmap table, if yes, returning to step b11); otherwise, inquiring the corresponding Service Active ONU Bitmap register and Service Active Port Bitmap table of the service with the next priority.

8. The method according to claim 6, wherein
for the EF service, said granting information comprising sizes of data transmission; said report information comprising reported sizes of data waiting to be transmitted;
for the EF service, said step of scheduling granted start time in step d) comprising: taking said start time of data transmission of said granting information as the granted start time of data transmission;
for the non-automatic detecting MPCP message service, said granting information comprising downlink MPCP message type and reserved field, wherein said MPCP message type comprising Discovery GATE, Normal GATE and REGISTER&GATE; said report information comprising MPCP message type field and reserved field;
for the MF service, said granting information comprising reserved field and sizes of data transmission; said report information comprising reported sizes of data waiting to be transmitted;
for the Assured Forwarding service, said granting information comprising grant deficit quantity and sizes of data transmission of corresponding service ports; said report information comprising reported sizes of data waiting to be transmitted;
for the Best-Effort Forwarding service, said granting information comprising sizes of data transmission; said report information comprising reported sizes of data waiting to be transmitted.

9. The method according to claim 1, further comprising:
generating, by the OLT, a start-up counter for the automatic detecting MPCP message service;
the step of authorizing service ports in step b) comprises:
b21) initiating, by the OLT, said start-up counter, when said counter achieves configured threshold, launching the process of the automatic detecting MPCP messages service detecting, if an automatic detecting MPCP message is detected, proceeding to step b22); otherwise, resetting the start-up counter and returning to step b21);
b22) determining, by the OLT, whether current bandwidth resource is available to the constant amount of data of said current to-be-granted service port, according to the residual bandwidth resource in current bandwidth allocation polling period of the automatic detecting MPCP message service, if yes, entering step b23), otherwise, authorizing the ports of the next priority service;
b23) resetting, by the OLT, the start-up counter and returning to step b21).

10. The method according to claim 9, wherein
for the automatic detecting MPCP message service, said granting information comprising downlink MPCP message type and reserved field, wherein said MPCP message type comprising Discovery GATE, Normal GATE, REGISTER&GATE.

11. The method according to claim 1, after step d) further comprising: determining, by the OLT, whether there is still any ONU with un-granted port, if yes, returning to step c); otherwise, ending.

12. The method according to claim 1, wherein the type of said downlink granting messages of the method is GATE downlink MPCP message.

13. The method according to claim 6, wherein said uplink granting information of the present method being carried by REPORT messages.

14. The method according to claim 2, wherein said bandwidth allocation polling period of the present method is the virtual frame period.

15. The method according to claim 7, wherein
for the EF service, said granting information comprising sizes of data transmission; said report information comprising reported sizes of data waiting to be transmitted;
for the EF service, said step of scheduling granted start time in step d) comprising: taking said start time of data transmission of said granting information as the granted start time of data transmission;
for the non-automatic detecting MPCP message service, said granting information comprising downlink MPCP message type and reserved field, wherein said MPCP message type comprising Discovery GATE, Normal GATE and REGISTER&GATE; said report information comprising MPCP message type field and reserved field;
for the MF service, said granting information comprising reserved field and sizes of data transmission; said report information comprising reported sizes of data waiting to be transmitted;
for the Assured Forwarding service, said granting information comprising grant deficit quantity and sizes of data transmission of corresponding service ports; said report information comprising reported sizes of data waiting to be transmitted;
for the Best-Effort Forwarding service, said granting information comprising sizes of data transmission; said report information comprising reported sizes of data waiting to be transmitted.

16. The method according to claim 7, wherein said uplink granting information of the present method being carried by REPORT messages.

17. The method according to claim 6, wherein said bandwidth allocation polling period of the present method is the virtual frame period.

18. A method for dynamic bandwidth allocation in a Passive Optical Network (PON), said PON includes an OLT and a plurality of ONUs accessing the OLT, comprising:
a) classifying, by the OLT, services which are to be communicated between the OLT and an ONU into a plurality of service types according to different transmitting requirements, and granting a different priority to each type of the services;

b) authorizing, by the OLT, a service port of each type of services to transmit service data in descending sequence of said priorities of the services, and recording the granting information of the service ports obtained from the authorization;

c) reading out, by the OLT, said granting information of every to-be-granted service port of the current ONU; and d) scheduling, by the OLT, start time of granted data transmission of every to-be-granted service port of current ONU, generating a downlink granting message including both said granting information and said start time of granted data transmission of every granted port of said current ONU, and transmitting said downlink granting messages to said current ONU;

wherein said services being classified by priority in descending sequence in step a) as Expedited Forwarding (EF) service, automatic detecting MPCP message service, non-automatic detecting MPCP message service, MF service, Assured Forwarding service and Best-Effort Forwarding service, wherein as to services except automatic detecting MPCP message service, said step of authorization in step b) comprises:

b11) confirming, by the OLT, current to-be-granted service port according to uplink service activating status;

b12) according to the residual bandwidth resource in the current bandwidth allocation polling period, determining, by the OLT, whether current bandwidth resource is available to the constant amount of data of said current to-be granted service port for non-automatic detecting MPCP message service, or to the report information from said current to-be-granted service port for the other types of the services, if yes, proceeding to step b13); otherwise, proceeding to step b15);

b13) authorizing, by the OLT, said current to-be-granted service port to transmit service data, and recording the current granting information;

b14) updating, by the OLT, residual bandwidth in the current bandwidth allocation polling period and relevant information of said current to-be-granted service port; and b15) determining, by the OLT, whether there are un-granted service ports of current priority service, if yes, returning to step b11); otherwise, authorizing the ports of the next priority service, and the method further comprising:

generating, by the OLT, a Service Active ONU Bitmap register for every type of service to store active information indicating whether the type of service is activated in the ONUs;

generating, by the OLT, a Service Active Port Bitmap table for services with port as unit, which is indexed by ONUID, to store active information indicating whether this type of service is activated in the accessed service ports of the ONUs;

generating, by the OLT, a vMAC Report Information table indexed by ONUID, to store report information from the accessed ports of the ONUs;

step b11) comprises: polling, by the OLT, the Service Active ONU Bitmap register and the Service Active Port Bitmap table of every service type in descending sequence of priorities, finding out a service port with positive active information and confirming the service port as said current to-be-granted service port;

before step b12) further comprising: finding out, by the OLT, report information of current to-be-granted service port from the vMAC Report Information table; and in step b15), determining, by the OLT, whether there are unread table items in current Service Active ONU Bitmap register and current Service Active Port Bitmap table, if yes, returning to step b11); otherwise, inquiring the corresponding Service Active ONU Bitmap register and Service Active Port Bitmap table of the service with the next priority.

19. The method according to claim 18, wherein for the EF service, said granting information comprising start time of data transmission and sizes of data transmission; said report information comprising reported sizes of data waiting to be transmitted;

for the EF service, said step of scheduling granted start time in step d) comprising: taking said start time of data transmission of said granting information as the granted start time of data transmission;

for the non-automatic detecting MPCP message service, said granting information comprising downlink MPCP message type and reserved field, wherein said MPCP message type comprising Discovery GATE, Normal GATE and REGISTER&GATE; said report information comprising MPCP message type field and reserved field;

for the MF service, said granting information comprising reserved field and sizes of data transmission; said report information comprising reported sizes of data waiting to be transmitted;

for the Assured Forwarding service, said granting information comprising grant deficit quantity and sizes of data transmission of corresponding service ports; said report information comprising reported sizes of data waiting to be transmitted;

for the Best-Effort Forwarding service, said granting information comprising sizes of data transmission; said report information comprising reported sizes of data waiting to be transmitted.

20. A method for dynamic bandwidth allocation in a Passive Optical Network (PON), said PON includes an OLT and a plurality of ONUs accessing to the OLT, comprising:

a) classifying, by the OLT, services which are to be communicated between the OLT and an ONU into a plurality of service types according to different transmitting requirements, and granting a different priority to each type of the services;

b) authorizing, by the OLT, a service port of each type of services to transmit service data in descending sequence of said priorities of the services, and recording the granting information of the service ports obtained from the authorization;

c) reading out, by the OLT, said granting information of every to-be-granted service port of the current ONU; and d) scheduling, by the OLT, start time of granted data transmission of every to-be-granted service port of current ONU, generating a downlink granting message including both said granting information and said start time of granted data transmission of every granted port of said current ONU, and transmitting said downlink granting messages to said current ONU;

wherein said services being classified by priority in descending sequence in step a) as Expedited Forwarding (EF) service, automatic detecting MPCP message service, non-automatic detecting MPCP message service, MF service, Assured Forwarding service and Best-Effort Forwarding service, wherein as to services except automatic detecting MPCP message service, said step of authorization in step b) comprises:

b11) confirming, by the OLT, current to-be-granted service port according to uplink service activating status;

b12) according to the residual bandwidth resource in the current bandwidth allocation polling period, determining, by the OLT, whether current bandwidth resource is available to the constant amount of data of said current to-be granted service port for non-automatic detecting MPCP message service, or to the report information from said current to-be-granted service port for the other types of the services, if yes, proceeding to step b13); otherwise, proceeding to step b15);

b13) authorizing, by the OLT, said current to-be-granted service port to transmit service data, and recording the current granting information;

b14) updating, by the OLT, residual bandwidth in the current bandwidth allocation polling period and relevant information of said current to-be-granted service port; and b15) determining, by the OLT, whether there are un-granted service ports of current priority service, if yes, returning to step b11); otherwise, authorizing the ports of the next priority service, wherein for the EF service, said granting information comprising start time of data transmission and sizes of data transmission; said report information comprising reported sizes of data waiting to be transmitted;

for the EF service, said step of scheduling granted start time in step d) comprising: taking said start time of data transmission of said granting information as the granted start time of data transmission;

for the non-automatic detecting MPCP message service, said granting information comprising downlink MPCP message type and reserved field, wherein said MPCP message type comprising Discovery GATE, Normal GATE and REGISTER&GATE; said report information comprising MPCP message type field and reserved field;

for the MF service, said granting information comprising reserved field and sizes of data transmission; said report information comprising reported sizes of data waiting to be transmitted;

for the Assured Forwarding service, said granting information comprising grant deficit quantity and sizes of data transmission of corresponding service ports; said report information comprising reported sizes of data waiting to be transmitted;

for the Best-Effort Forwarding service, said granting information comprising sizes of data transmission; said report information comprising reported sizes of data waiting to be transmitted.

21. A method for dynamic bandwidth allocation in a Passive Optical Network (PON), said PON includes an OLT and a plurality of ONUs accessing the OLT, comprising:

a) classifying, by the OLT, services which are to be communicated between the OLT and an ONU into a plurality of service types according to different transmitting requirements, and granting a different priority to each type of the services;

b) authorizing, by the OLT, a service port of each type of services to transmit service data in descending sequence of said priorities of the services, and recording the granting information of the service ports obtained from the authorization;

c) reading out, by the OLT, said granting information of every to-be-granted service port of the current ONU; and d) scheduling, by the OLT, start time of granted data transmission of every to-be-granted service port of current ONU, generating a downlink granting message including both said granting information and said start time of granted data transmission of every granted port of said current ONU, and transmitting said downlink granting messages to said current ONU;

wherein said services being classified by priority in descending sequence in step a) as Expedited Forwarding (EF) service, automatic detecting MPCP message service, non-automatic detecting MPCP message service, MF service, Assured Forwarding service and Best-Effort Forwarding service, and the method further comprising:

generating, by the OLT, a start-up counter for the automatic detecting MPCP message service;

the step of authorizing service ports in step b) comprises:

b21) initiating, by the OLT, said start-up counter, when said counter achieves configured threshold, launching the process of the automatic detecting MPCP messages service detecting, if an automatic detecting MPCP message is detected, proceeding to step b22); otherwise, resetting the start-up counter and returning to step b21);

b22) determining, by the OLT, whether current bandwidth resource is available to the constant amount of data of said current to-be-granted service port, according to the residual bandwidth resource in current bandwidth allocation polling period of the automatic detecting MPCP message service, if yes, entering step b23), otherwise, authorizing the ports of the next priority service;

b23) resetting, by the OLT, the start-up counter and returning to step b21).

* * * * *